No. 848,487. PATENTED MAR. 26, 1907.
DEN-ICHIRO NISHIZAKI.
TURBINE REGULATOR.
APPLICATION FILED AUG. 9, 1906.
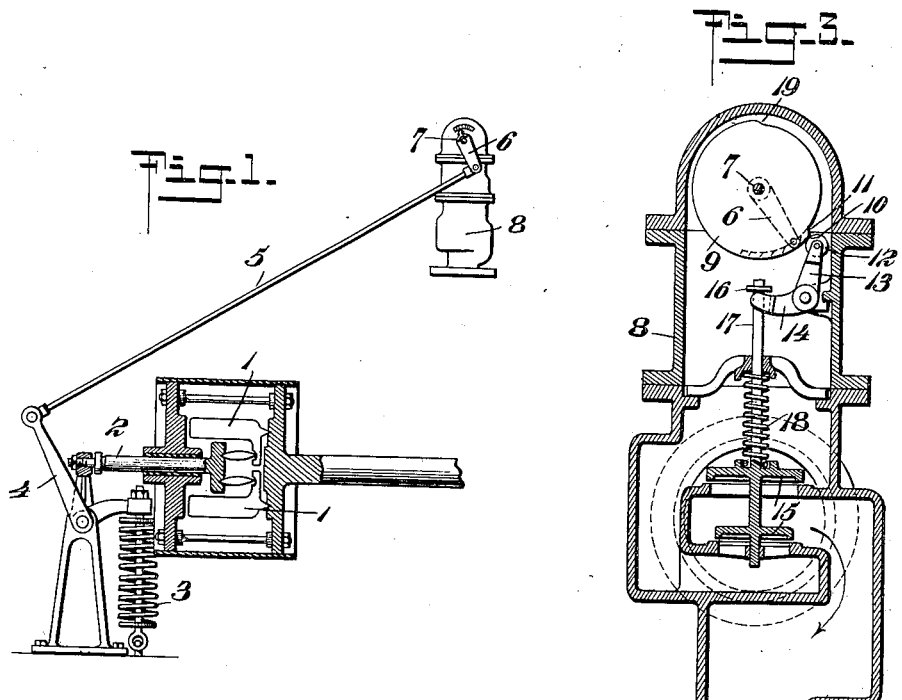
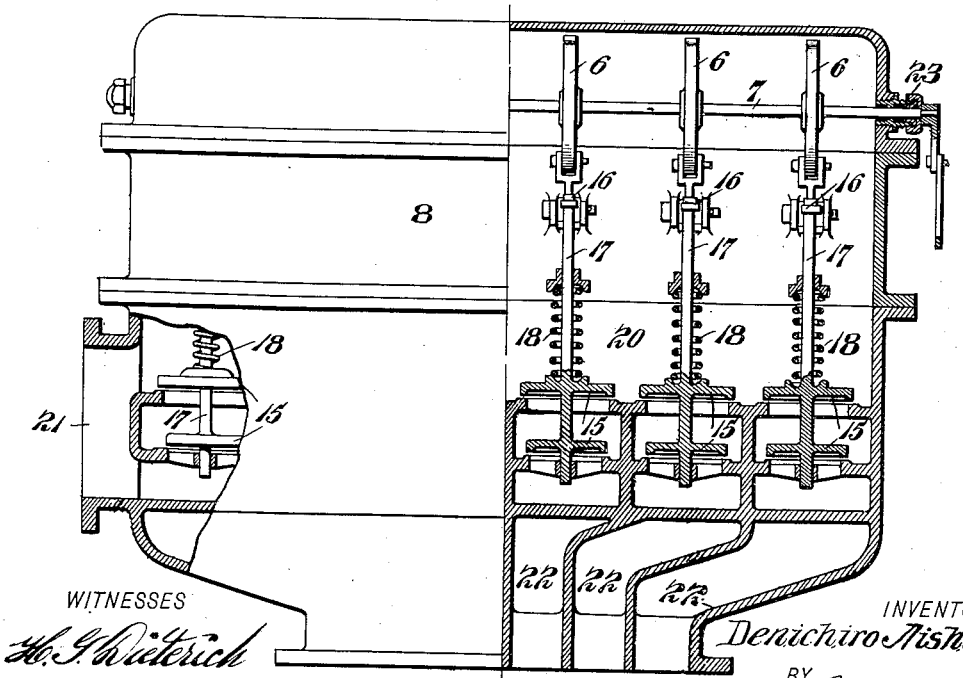
WITNESSES
INVENTOR
Denichiro Nishizaki
BY
ATTORNEYS

UNITED STATES PATENT OFFICE.

DEN-ICHIRO NISHIZAKI, OF TOKYO, JAPAN.

TURBINE-REGULATOR.

No. 848,487.     Specification of Letters Patent.     Patented March 26, 1907.

Application filed August 9, 1906. Serial No. 329,942.

*To all whom it may concern:*

Be it known that I, DEN-ICHIRO NISHIZAKI, a subject of the Emperor of Japan, residing at No. 1, Tsuna-machi, Mita, Shiba-ku, Tokyo, Japan, have invented a new and Improved System of Elastic - Fluid - Turbine Regulator, of which the following, taken in connection with the accompanying drawings, is a specification.

My invention relates to a system of elastic-fluid-turbine regulator to be used in connection with elastic-fluid turbines claimed in my previous applications, Cases A and B; and its objects are to obtain results of very sensitive speed regulation with said elastic-fluid turbines by reducing friction of the working parts of the regulator to the minimum, as it is known that friction destroys the sensitiveness of the regulator.

Other features of the invention will be pointed out and claimed in the following specification.

To these ends I construct my elastic-fluid-turbine regulator with only one packing about the working spindle, which turns about its own axis and does not reciprocate, the remaining parts of the regulating mechanism being wholly immersed in a chamber which contains working fluid, said spindle being operated from a centrifugal governor. Such a frictionless regulator is shown in the accompanying drawings, which illustrate an embodiment of my present invention, and in which—

Figure 1 shows the connection of the regulator and centrifugal governor; and Figs. 2 and 3 show longitudinal and cross sections, respectively, of the regulator.

Throughout the drawings similar letters refer to similar parts.

In Fig. 1, 1, 2, and 3 compose the centrifugal governor, in which 1 shows governor-weights which push out a rod 2 to the left-hand side and are balanced with a spring 3 when a portion of the load is taken off, as is done in many centrifugal governors. When 2 is pushed to the left-hand side, the arm 4 turns to the same direction, and the motion being transmitted through the rod 5 the arm 6 is turned to the left-hand side about the center of its spindle 7, which is also turned, together with the stated arms 6. Now in Figs. 2 and 3, which show longitudinal and cross sections, respectively, of the regulator 8 in Fig. 1, when the spindle 7 is turned clockwise a cam 9, fixed to the spindle 7, also turns in the same sense so far as the portion 10 to 11 of said cam 9 passes over the roller 12, which gears with the cam 9, as shown, and consequently the arm 13, which is pressed against the cam 9 through the said roller 12, turns to the left-hand side by the weight of the other arm 14, and as the consequence of this the arm 14, which supports a double beat or balanced valve 15, open at collar 16, which is fitted at the end of the valve-stem 17, turns downward, and the valve 15 is closed by its own weight and by the aid of a small spring, as shown, and vice versa. The radii of the cam vary for a small portion between marks 10 and 11, as shown, and the remaining parts of the cam are composed of two circular parts 10 to 19 and 11 to 19, so that opening and closing of the valve 15 corresponds to a small fraction of the whole variation of the turbine speed. There are as many valves actuated with cams and rollers as there are nozzles. Working fluid coming into room 20 at 21 enters each of the rooms 22 through valves that are left open, whence it flows toward the corresponding nozzle. All cams are so mutually related to each other so that when the governor acts upon the valves the cams open or close the valves one by one in succession, so as to put as many nozzles in operation as any partial load renders necessary. This system of speed regulation is intended for extreme lightness of operation, for friction of packings, on account of which most speed-regulating devices are made unsensitive, is reduced to a minimum. In fact, only one packing at 23 will do about the spindle 7, which exerts very little friction on account of turning motion instead of reciprocating. By this means, perhaps, electrical or other elaborate means for sensitive speed regulation of turbine may be avoided.

The details of the elastic-fluid-turbine regulator which have been fully illustrated in the accompanying drawings may be more or less altered without changing the spirit of my invention.

Having thus particularly described and ascertained the nature of my said invention and in what manner the same is to be performed, what I claim as new, and desire to secure by Letters Patent of the United States of America, is—

1. In elastic-fluid turbines, a speed-regulator comprising a cam, a balanced throttle-valve, a lever connected with the valve and acted upon by the cam, said speed-regulator being immersed in the working-fluid chamber of the turbine, substantially as and for the purpose described.

2. In an elastic-fluid turbine, a speed-regulator comprising a plurality of balanced throttle-valves, a cam for each valve, a lever connected with each throttle-valve and acted upon by the cam, all of said speed-regulator being immersed in the working chamber of the turbine, the cams being arranged to open or close the throttle-valve in succession, substantially as and for the purpose described.

3. In elastic-fluid turbines, the combination with the working-fluid chamber and the nozzle for admitting fluid thereto, of a double-seated valve controlling the nozzle and a speed-regulator within the chamber, said speed-regulator comprising a bell-crank having one arm connected with the stem of the valve, the other arm being provided with a roller, a cam whose periphery engages the roller, whereby to operate the valve.

4. In elastic-fluid turbines, the combination with the working-fluid chamber and the nozzles for admitting fluid thereto, of double-seated valves controlling the nozzles, and a speed-regulator within the chamber, said speed-regulator comprising a shaft provided with a cam for each nozzle, bell-crank levers having in one arm thereof a roller for engaging the respective cam, the other arm being connected with the valve-stem.

5. In elastic-fluid turbines, a speed-regulator consisting of a cam and a roller acting upon a double-seated nozzle-valve, said roller being held on one arm of a bell-crank, the other arm of which acts upon a collar at top of stem of said nozzle-valve only when the valve is open, and gets out of contact with the collar when the valve is closed, the whole system being immersed into a working-fluid chamber, substantially as and for the purpose described.

6. In elastic-fluid turbines, a speed-regulator consisting of cams and rollers acting upon double-seated nozzle-valves, each of said rollers being held on one of the arms of bell-crank, the other arm of which acts upon collar at top of stem of said nozzle-valve only when that valve is open and gets out of contact with the collar when that valve is closed, the whole system being immersed into a working-fluid chamber, and said cams and rollers being so situated that the nozzle-valves may open or close one by one successively when they are in operation substantially as and for the purpose described.

In testimony whereof I have hereto signed my name in the presence of two subscribing witnesses.

DEN-ICHIRO NISHIZAKI.

Witnesses:
 JOHN E. JONES,
 GENJI KURIBARA.